United States Patent

Feiken et al.

[11] Patent Number: 5,870,479
[45] Date of Patent: Feb. 9, 1999

[54] DEVICE FOR PROCESSING DATA PACKETS

[75] Inventors: Albertus Feiken, Amstelveen; Martin Klaas De Lange, Voorburg; Gerrit Roelofsen, Gouda; Maurice Matthias Feijen, Rijswijk; Jean Paul Boly, Zoeterwoude, all of Netherlands

[73] Assignee: Koninklijke PTT Nederland N.V., Netherlands

[21] Appl. No.: 619,618

[22] PCT Filed: Oct. 25, 1994

[86] PCT No.: PCT/EP94/03482

§ 371 Date: Apr. 2, 1996

§ 102(e) Date: Apr. 2, 1996

[87] PCT Pub. No.: WO95/12264

PCT Pub. Date: May 4, 1995

[30] Foreign Application Priority Data

Oct. 25, 1993 [NL] Netherlands .......................... 9301841

[51] Int. Cl.⁶ .................................................. H04L 9/00
[52] U.S. Cl. .................................................. 380/49; 380/33
[58] Field of Search ....................................... 380/49, 33

[56] References Cited

U.S. PATENT DOCUMENTS

| 5,048,087 | 9/1991 | Trbovich et al. | 380/43 |
| 5,235,644 | 8/1993 | Gupta et al. | 380/48 |
| 5,323,389 | 6/1994 | Bitz et al. | 370/60.1 |
| 5,381,481 | 1/1995 | Gammie et al. | 380/49 |

FOREIGN PATENT DOCUMENTS

| 0360478 | 3/1990 | European Pat. Off. . |
| 0464562 | 1/1992 | European Pat. Off. . |
| 4125830 | 1/1993 | Germany . |
| 9012465 | 10/1990 | WIPO . |
| 9222034 | 12/1992 | WIPO . |
| 9309627 | 5/1993 | WIPO . |
| 9512264 | 5/1995 | WIPO . |

OTHER PUBLICATIONS

W. Diffie et al., "Privacy and Authentication: An Introduction to Cryptography", Proceedings of the IEEE, Mar. 1979, vol. 67, No. 3, pp. 397–427.

J.R. Sherwood, "Data Security In Packet Switched Networks", Second IEEE National Conference on Telecommunications, York, United Kingdom, Apr. 24, 1989, pp. 375–379.

*Primary Examiner*—Gilberto Barron, Jr.
*Attorney, Agent, or Firm*—Michaelson & Wallace; Peter L. Michaelson; John C. Pokotylo

[57] ABSTRACT

The invention relates to a device (1) for processing data packets, comprising identification means (14) for identifying a data packet, processing means (11, 12) for cryptographically processing the data packet, and memory means (13) for storing information relating to the processing, in which device the processing means comprise at least a first (11) and a second (12) processing unit. Control means (14) are provided to assign, on the basis of the identification of a data packet, said data packet to one of the processing units and to process said data packet with the aid of information related to said data packet. Preferably, at least one processing unit (11; 12) is designed to encrypt or decrypt data packets, and the information relating to the processing comprises a key and a status of a processing procedure.

16 Claims, 3 Drawing Sheets

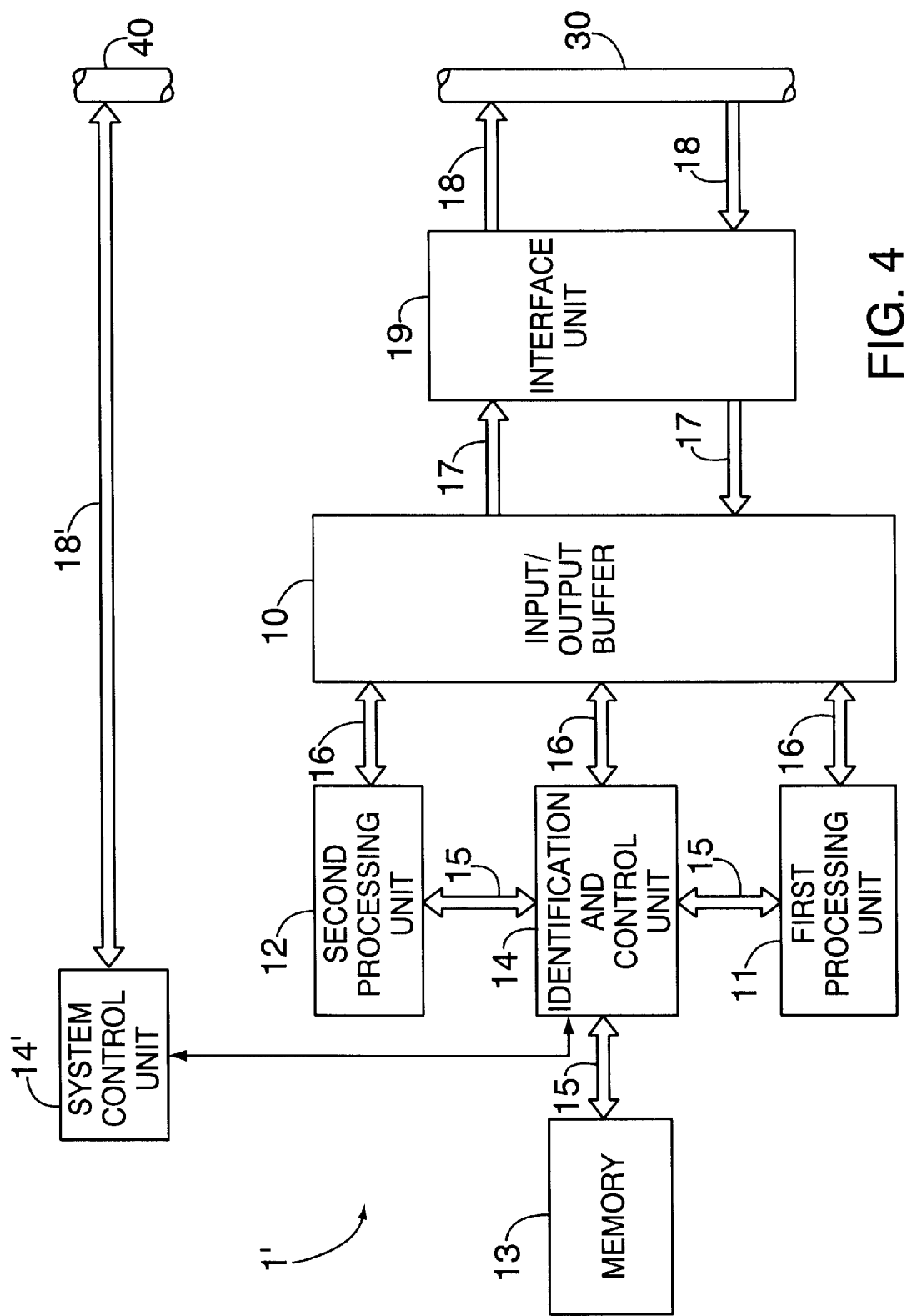

DEVICE FOR PROCESSING DATA PACKETS

BACKGROUND OF THE INVENTION

The present invention relates to a device for processing data packets. More in particular, the present invention relates to a device for cryptographically processing data packets, said device comprising identification means for identifying a data packet, processing means for cryptographically processing the data packet, memory means for storing information relating to the processing, and control means for selecting information related to the data packet. A device of this type is disclosed in the Specification of U.S. Pat. No. 5,048,087.

In practice it is known to arrange for data communication, including telephony, to take place by means of data packets. Diverse techniques for data communication with the aid of data packets, such as X.25 and ATM ("asynchronous transfer mode"), are known. The need exists to an increasing extent to secure the data traffic by means of encrypting the messages (data packets). For this purpose, an encrypting device can be incorporated at the transmitting end and a decrypting device at the receiving end in the data connection concerned.

In modern data communication techniques, data packets belonging to a plurality of logical connections are transmitted via a single physical connection. Such logical connections will hereinafter generally be referred to as channels. Thus, for example, in the case of ATM, a plurality of "virtual channels" and "virtual paths" may use the same physical connection. At the same time, there is no fixed correlation between the consecutive data packets, referred to as "cells" in the case of ATM. The channel to which the data packet belongs can be read only from the header of each data packet.

If one or more of said channels is to be secured by encrypting, measures have to be taken to encrypt and decrypt data packets of a particular logical connection in a particular way, for example with a key belonging to the logical connection. For this purpose, the data packets of the different logical connections have to be identified in order to be able to determine the particular channel, and consequently, for example, the associated key, of a particular data packet.

In the device disclosed in U.S. Pat. No. 5,048,087, the identification means are formed by a packet identifier. Stored in a memory is a plurality of keys, one of which is retrieved in each case in order to process a data packet of a particular channel (logical connection) in the cryptographic unit provided therefor. In addition, in the known device, a cryptographic residue is, in each case, retrieved or, respectively, stored in addition to the key. Such a cryptographic residue can represent the status of a cryptographic process by which related data packets are encrypted or decrypted, respectively.

The known device has the disadvantage that it is relatively slow. For each incoming data packet, the matching key and the matching residue have to be loaded on the basis of the identification, after which the cryptographic processing (encrypting or decrypting) takes place. After the processing, the new residue (and possibly the key) has to be stored, in each case, before a subsequent data packet can be processed. It will be clear that the repeated performance, that is to say the performance for each data packet, of said steps takes place at the expense of the processing speed of the known device and, consequently, of the throughput speed of the data packets to be processed.

The storage and retrieval of only a key for each channel, which is disclosed per se, for example, in the publication "Data security in packet switched networks", which is specified in greater detail below, may, in principle, be faster but still requires a relatively large amount of processing time. Such a solution is furthermore unsuitable for cryptographic procedures whose status has to be stored between two processing steps. It is precisely such procedures which are at present much used for encrypting data communication.

International Patent Application WO93/09627 discloses a cryptographic apparatus for use in computer networks. In its key generator, the apparatus comprises pairs of parallel registers each outputting a single key bit. Depending on data packets being designated "local" or "broadcast", the key bits of one of the pairs of registers is used to contribute to the running key encrypting the data packets. This known design is not suitable for cryptographically processing data packets of a large number of channels at a high data rate.

In modern data communication, speed plays an ever greater role. Devices for processing data packets, such as cryptographic devices, therefore have to satisfy ever higher speed requirements. In the known device, which involves reloading and storing related processing information for each data packet, said retrieval and storage of information forms a speed-limiting factor.

SUMMARY OF THE INVENTION

The object of the invention is to eliminate the abovementioned and other disadvantages of the prior art and to provide a device for processing data packets which makes possible a rapid processing of data packets even if a status of a processing procedure has to be stored for each data packet and the data packets belong to different channels. In particular, the object of the invention is to provide a device which is suitable for encrypting and/or decrypting data packets in ATM networks.

For this purpose, the device according to the present invention is characterized in that the processing means comprise at least a first and a second processing unit, and in that the control means are designed to assign, on the basis of the identification of a data packet, said data packet to one of the processing units and to process said data packet with the aid of information related to said data packet. In other words, in the device according to the invention, there is present a plurality of, preferably parallel, processing devices, so that a plurality of data packets can be processed essentially simultaneously. At the same time, the control means are designed such that they assign an identified data packet to a suitable processing unit. A suitable processing unit may be understood as meaning either a processing unit which is available at a particular instant or one in which certain information of a processing procedure is present.

In a first embodiment of the device according to the invention, at least one processing unit is designed to encrypt data packets, while in a second embodiment, at least one processing unit is designed to decrypt data packets. Because the device according to the invention is provided with a plurality of processing units, it is possible both to encrypt and to decrypt data packets in a single device, optionally essentially simultaneously. The device according to the invention can be used not only for cryptographic functions but also for other applications such as parity control of data packets. Advantageously, the processing units are of programmable design, so that various processing procedures can be performed with one processing unit. The programs for performing the processing procedures are advantageously stored in the memory means, so that a suitable procedure can be loaded under the influence of the control means, optionally in conjunction with the identification means.

Preferably, a buffer is provided upstream of the processing units, that is to say between the input of the device and the processing units. Data packets can be temporarily stored in said buffer before the) are transferred to a processing unit. The temporary storage provides the control means, in conjunction with the identification means, with the time needed to determine the respective channels of the data packets and to select and optionally adjust a suitable processing unit. In the case of low data speeds, it may be possible to omit the buffer. Optionally, the buffer can be incorporated in the processing units, for example by providing each processing unit with a separate input buffer.

In an advantageous embodiment, the control means are designed to assign data packets which belong to the same channel to the same processing unit. In this way, the processing time for the data packets of said channel is reduced still further.

Advantageously, the device according to the invention can be used in ATM networks. For this purpose, the device can be designed such that a fixed time relationship exists between the arrival and the departure of data packets. Such a fixed time relationship can be achieved b) a suitable design of the control means. Optionally, an output buffer can be provided for this purpose, but also to fulfil (other) synchronization purposes.

REFERENCES

[1] J. R. Sherwood, "Data security in packet switched networks", Second IEE National Conference on Telecommunications, York, U.K., 2–5 April 1989.
[2] W. Diffie et al., "Privacy and Authentication: An Introduction to Cryptography", Proceedings of the IEEE, Vol. 67, No. 3, March 1979.
[3] U.S. Pat. No. 5,048,087
[4] WO 90/12465
[5] WO 93/09627
These references are herewith incorporated in this text.

BRIEF DESCRIPTION OF THE DRAWINGS

The invention will be explained below in greater detail with reference to the figures.

FIG. 4 shows diagrammatically an alternative embodiment of the device according to the invention.

DESCRIPTION OF PREFERRED EMBODIMENTS

Figure 1:
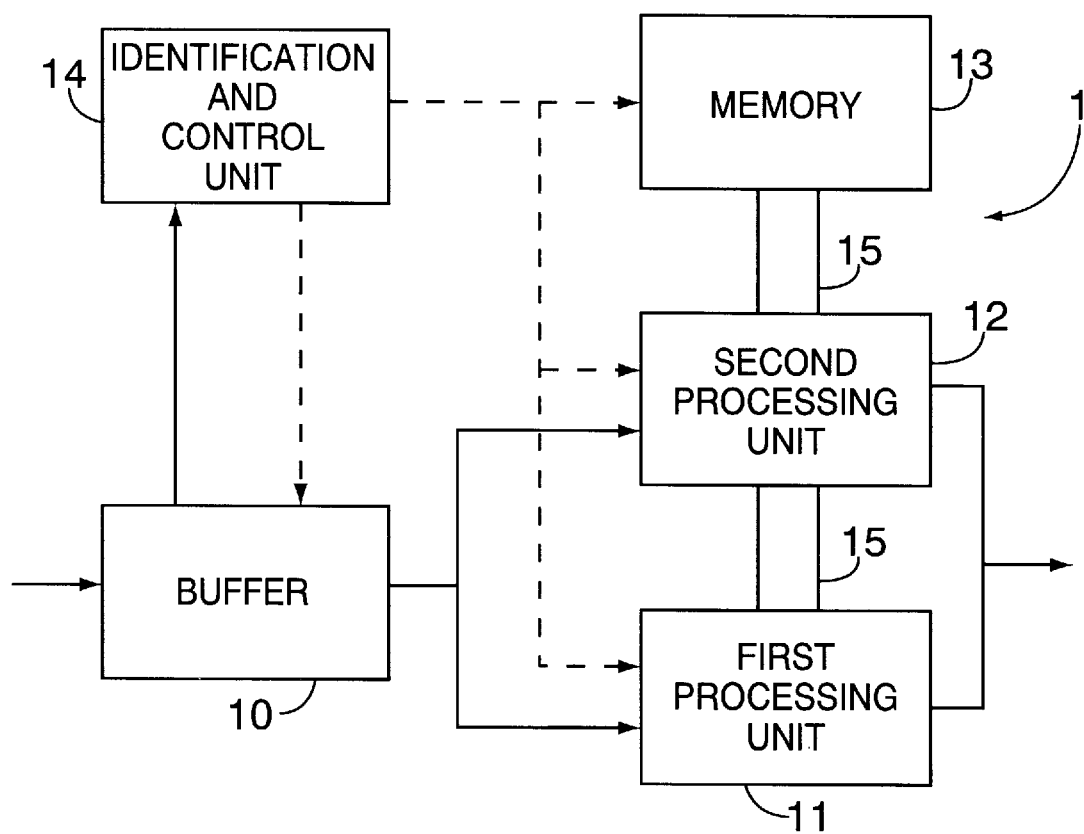
FIG. 1 shows diagrammatically a device according to the invention for processing data packets.

The device 1 according to the invention shown diagrammatically in FIG. 1 comprises a buffer 10, a first processing unit 11, a second processing unit 12, a memory 13 and an identification and control unit 14. The processing units 11 and 12 and the memory 13 are connected by a common data bus 15. Data connections are indicated in FIG. 1 by continuous lines and control connections by broken lines.

A data packet which enters the device 1 is first temporarily stored in the buffer 10. During this time, the header of the data packet is copied to the identification unit 14, where the channel (in the case of ATM, the virtual channel or the virtual path) of the data packet is determined. On the basis of this identification, the control unit, which is incorporated in the identification unit in the embodiment shown but can also form a separate unit, activates the other sections of the device 1. If a processing unit (11 or 12) is free, it is given the instruction to receive a data packet. Essentially simultaneously, the buffer 10 is instructed to release the data packet concerned, while the memory 13 is instructed to place the information belonging to said channel (for example, the key and the status of the encrypting/decrypting procedure, and optionally the software of a processing) on the bus 15. Subsequently, the processing unit concerned reads in both the information and the data packet and performs the desired processing, after which the data packet (for example, under the control of the control unit) is transmitted by the processing unit. If said transmission does not take place under the control of the control unit, the processing units are preferably coupled such that they cannot transmit a data packet simultaneously. In order to prevent synchronization problems, for example, it may be advantageous to provide a further buffer (not shown) at the output of the device 1 or to provide each processing unit with its own output buffer.

The device 1 has, according to the invention, at least two (parallel) processing units. As a result, it is possible, in the first place, to process two data packets simultaneously. In this case, said data packets may either be of the same channel or of different channels. It will be clear that the throughput speed of the data packets is substantially increased by the presence of a plurality of parallel processing units. If desired, more than two processing units, such as three, four, five or more processing units may, as was stated above, be used, as a result of which a further increase in speed can be achieved.

In the second place, the presence of two (or more) parallel processing units offers the possibility of processing data packets of a particular channel in one processing unit, while data packets of another channel or of other channels are processed in another processing unit. In other words, the control is designed such a way that data packets of a particular channel are sent to that processing unit in which a data packet of the same channel has previously been processed. As a result, the processing speed can be increased because loading the information needed from the memory and optionally storing information after processing every time can be omitted in the case of that processing unit. Furthermore there is the possibility of reserving one of the processing units (or, in the case of more than two processing units, several processing units) for a particular channel, for example if a relatively large amount of data packets belong to said channel. Said reservation may optionally take place dynamically, for example on the basis of statistical data stored by the identification and control unit. As a result, the throughput speed can be increased further, at least for the channel concerned. Suitable measures, for example the adjustment of the buffer capacity to the expected quantity of data packets which cannot be processed directly, can be taken for this purpose, if necessary, in the buffer 10.

In the third place, the device according to the invention offers the possibility, for example, of encrypting in one processing unit, while the other processing unit is used at the same instant for decrypting. In other words, with the device according to the invention, it is possible to perform a plurality of processes and different processes simultaneously in one device. At the same time, it is also possible to perform no processing at all in one processing unit at a particular instant, optionally depending on the channel of the data packet concerned. If it is desired not to perform any processing on the data packets in many cases, for example for many channels, it may be advantageous to provide, parallel to the processing units, a connection which connects the buffer 10 directly to the output of the device 1.

It should be pointed out, that in the embodiment shown, one memory is present which is connected via a common data bus to all the processing units, i.e. two in the case shown. It may be advantageous to design the device in such a way that each of the processing units has its own memory, in which case the common data bus may optionally be omitted. However, a common data bus for the two or more processing units provides the possibility for the processing units to exchange data, e.g. cryptographic data.

It is furthermore possible to incorporate the identification unit (the identification means) in the memory 13. In this case, the header of a data packet may, for example, be used to address the memory directly or indirectly (for example, by means of multiplexing).

The device according to the invention may be constructed of standard components. In this connection, reference is made to general handbooks in the field of electronics, such as "The Art of Electronics" by P. Horowitz and W. Hill, Cambridge University Press, 1989. Advantageously, the device may, however, be designed as an ASIC ("application-specific integrated circuit"). The processing units preferably comprise a processor (for example, a microprocessor) for performing the processing. The processing itself may be a known cryptographic processing or a different type of processing. In this context, reference is made to the publication entitled "Privacy and Authentication: An Introduction to Cryptography" by W. Diffie et al. in proceedings of the IEEE, Vol. 67, No. 3, March 1979 and to the bibliography incorporated therein.

Figure 2:
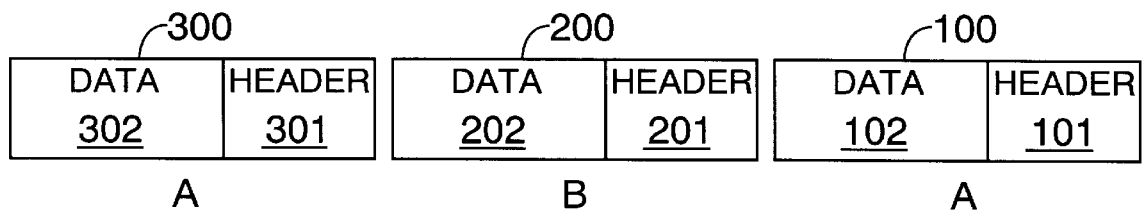
FIG. 2 shows diagrammatically a number of consecutive data packets to be processed.

FIG. 2 shows a series of data packets which are being encrypted with the aid of the device according to the invention. Three consecutive data packets 100, 200 and 300 each have a header 101, 201 and 301, respectively, and a data field 102, 202 and 302, respectively. In the example shown, the data packets 100 and 300 belong to the channel A, while the data packet 200 belongs to the channel B. For this purpose, the headers 101, 201 and 301 are provided with suitable identification information.

If the data packet 100 arrives in the device 1 and no other data packet was previously present in one of the processing units 11 or 12, the data packet 100 can be loaded directly into a processing unit, say the processing unit 11, together with the information belonging to the channel A which is retrieved from the memory 13 on the basis of the header 101. As soon as the connection between the buffer 10 or the memory 13 and the processing unit 12 is free, the data packet 200 can be loaded into the processing unit 12. In the meantime, the data packet 100 can be processed. As soon as this processing is completed, the processed data packet 100 can be transmitted. Information relating to channel A, for example the status of the encrypting procedure, has now possibly to be written back into the memory 13, depending on the processing performed. It will be clear that this writing-back and the subsequent retrieval of information relating to another channel can be omitted if the subsequent data packet loaded into the processing unit 11 also belongs to the channel A. In the case shown, the subsequent data packet (300) belongs to the channel A, so that time can in fact be saved since the processing unit 11 is already prepared for processing data packets of channel A. If the data packet were to belong to channel B, it could in some cases be advantageous to allow said data packet to wait in the buffer 10 until the processing unit 1 2 is free since said processing unit is already prepared for channel B. This could be the case, for example, if a further data packet (not shown) were to belong to the channel A. In order to perform such waiting effectively, the buffer 10 should be provided with adequate buffer capacity. Furthermore, it is advantageous to design the identification unit such that the identity (the channel) of a plurality of buffered data packets can be determined in order to be able to perform the assignment of the data packets to the processing units efficiently.

Figure 3:
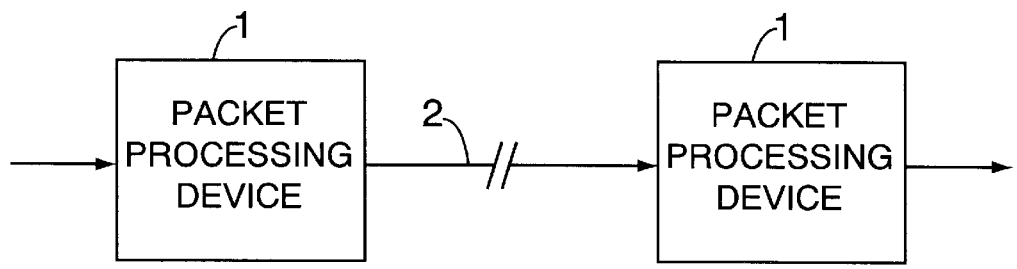
FIG. 3 shows diagrammatically a data communication system provided with devices according to FIG. 1.

FIG. 3 diagrammatically shows a data communication system. The system comprises two devices 1 (or 1', see FIG. 4) for processing data packets, the devices being connected by a link 2. With the aid of the device according to the invention, it is possible to transmit a plurality of encrypted logical channels via a single link at a high speed. In the system of FIG. 3, a plurality of devices 1 can, if necessary, be provided, for example in series, in order to be able to perform processes on data packets in a plurality of steps or at a plurality of positions.

The embodiment of the inventive device 1' shown schematically in FIG. 4 comprises, like the embodiment shown in FIG. 1, an input/output buffer 10, a first processing unit 11, a second processing unit 12, a memory 13 and an identification and control unit 14. The device of FIG. 4 is further provided with a system control unit 14', connected with an external data bus or data link 40 by a data bus 18'. This system control unit 14' may serve to control the system the device 1' is a constituent part of. The external bus 40 may, for example, serve to load suitable software and/or commands into the unit 14'.

The data bus 15, connecting the processing units 11 and 12 and the memory 13, is shown in FIG. 4 to consist of three separate parts, but it will be understood that these parts may be interconnected or reconfigured so as to form a data bus 15 consisting of one part only. Data buses 16 connect the units 11, 12 and 14 respectively, on the one hand, with the unit 10 on the other hand. Unidirectional data buses 17 interconnect the unit 10 and an interface unit 19, while unidirectional data buses 18 interconnect the interface unit 19 and an external bus or link 30. The buses 17 and/or 18 may each be configured as a single bidirectional data bus.

The main components of the device, such as the units 10, 11, 12, 14 and 19 may be constituted by programmable gate arrays (PGAs), such as supplied by Xilinx. The memory 13 may be constituted by a random access memory (RAM), and the system control 14' may comprise a microprocessor e.g. a Motorola 68000),RAM and EEPROM memory.

For (temporarily or permanently) storing the key(s) and status, e.g. the cryptographic residue, relating to a particular channel the memory 13 is provided. However, an even greater operating speed of the devices 1 and 1' can be achieved if separate buffers are provided for temporarily storing status data, such as a cryptographic residue or a cryptographic initialization value (newstate). Such buffers can advantageously be implemented as registers ("shadow registers") in the processing units 11 and 12. Preferably, the control unit 14 is designed so as to load data relating to a certain cell into a shadow register while the previous cell is still being processed in the processing unit concerned. This loading of data into a shadow register can be done as soon a data packet has been identified. The data of a shadow register can be loaded into the processing unit proper in a very short time, e.g. one clock cycle, as this loading need not involve the data bus 15.

It will be understood by those skilled in the art that the invention is not limited to the embodiments shown and that many modifications and extensions are possible without departing from the scope of the present invention, as defined by the appended claims.

We claim:

1. Device for cryptographically processing data packets, the device comprising:

identification means for identifying a data packet;

processing means for cryptographically processing the data packet, wherein the processing means include a first processing unit and a second processing unit;

memory means for storing information relating to the processing; and control means for selecting information related to the data packet, wherein the control means are designed to assign, on the basis of the identification of the data packet, said data packet to one of the first and second processing units and to process said data packet with the aid of information related to said data packet.

2. Device according to claim 1, wherein at least one of the first and second processing units is designed to encrypt data packets.

3. Device according to claim 1, wherein at least one of the first and second processing units is designed to decrypt data packets.

4. Device according to claim 2, wherein at least one of the first and second processing units is designed to decrypt data packets.

5. Device according to claim 2, wherein the information relating to the processing comprises a key and a status of a processing procedure.

6. Device according to claim 3, wherein the information relating to the processing comprises a key and a status of a processing procedure.

7. Device according to claim 1, wherein each of the data packets includes a header and an information field, and wherein the identification means are designed to identify a channel to which the data packet belongs on the basis of the header of the data packet.

8. Device according to claim 7, wherein the processing means are designed to process only the information field of a data packet.

9. Device according to claim 7, further comprising a buffer provided upstream of the first and second processing units.

10. Device according to claim 7, wherein the control means are designed to assign subsequent data packets which belong to the channel to the same one of the first and second processing units as the packet.

11. Device according to claim 7, further comprising a common data bus which connects the first processing unit, the second processing unit and the memory means.

12. Device according to claim 7, wherein at least one of the first and second processing units is provided with its own separate memory means.

13. Device according to claim 7, wherein at least one of the first and second processing units is programmable.

14. Device according to claim 7, wherein the data packets are ATM data packets.

15. System for data communication by means of data cells, provided with at least one device for cryptographically processing data packets, the device including:

identification means for identifying a data packet;

processing means for cryptographically processing the data packet, wherein the processing means include a first processing unit and a second processing unit;

memory means for storing information relating to the processing; and control means for selecting information related to the data packet, wherein the control means are designed to assign, on the basis of the identification of the data packet, said data packet to one of the first and second processing units and to process said data packet with the aid of information related to said data packet.

16. A device for cryptographically processing data packets, each of the data packets belonging to at least one of a plurality of channels, the device comprising:

identification means for identifying the at least one channel to which a data packet belongs;

processing means for cryptographically processing the data packet, wherein the processing means include a first processing unit and a second processing unit;

memory means for storing information, associated with each of the plurality of channels, for processing data packets from each of the plurality a channels; and control means for selecting information associated with the at least one channel which the data packet was identified as belonging to, wherein the control means are designed to assign, on the basis of the identification of the data packet, the data packet to one of the first and second processing units and to process the data packet with the aid of the selected information.

\* \* \* \* \*